(12) United States Patent
Valdez

(10) Patent No.: US 6,494,443 B2
(45) Date of Patent: Dec. 17, 2002

(54) END PLATES FOR AIR BELLOWS

(75) Inventor: John Valdez, Fontana, CA (US)

(73) Assignee: Ecore Corporation, Anaheim, CA (US)

( * ) Notice: Subject to any disclaimer, the term of this patent is extended or adjusted under 35 U.S.C. 154(b) by 0 days.

(21) Appl. No.: 09/822,971

(22) Filed: Mar. 29, 2001

(65) Prior Publication Data

US 2002/0140140 A1 Oct. 3, 2002

(51) Int. Cl.[7] ................................................. F16F 5/00
(52) U.S. Cl. ................... 267/122; 267/220; 188/321.11
(58) Field of Search ................... 267/122, 220, 267/64.19, 64.23, 64.27, 64.28, 64.21; 188/321.11; 280/124.147, 124.155, 124.158; 277/349, 350–353, 367, 389, 392

(56) References Cited

U.S. PATENT DOCUMENTS

| | | | | |
|---|---|---|---|---|
| 4,535,998 A | * | 8/1985 | Katz ..................... | 188/322.17 |
| 4,798,369 A | * | 1/1989 | Geno et al. ............... | 188/266.2 |
| 5,178,241 A | * | 1/1993 | Aubry ......................... | 188/280 |
| 5,180,144 A | * | 1/1993 | Hellyer et al. ........... | 267/64.19 |
| 5,487,454 A | * | 1/1996 | Klembczyk et al. ........ | 188/280 |
| 5,655,778 A | * | 8/1997 | Cavanaugh .................. | 277/315 |
| 6,345,707 B1 | * | 2/2002 | Klembczyk ................. | 188/298 |

* cited by examiner

Primary Examiner—Pam Rodriguez
(74) Attorney, Agent, or Firm—Dennis W. Beech

(57) ABSTRACT

The air bellows device for use with automobiles has a bellows element as commonly understood for use in slidable engagement with for example the struts of an automobile to raise and lower the frame relative to the axles. The air pressure end plate and pressure end plate are attached to the end caps of the bellows element using five or more holes through which bolts pass to threadably engage five or more threaded holes in each end cap. In addition the gap between the strut shaft and the wall of the openings in each end plate to receive the strut shaft is sealed by the use of two O-rings.

4 Claims, 4 Drawing Sheets

END PLATES FOR AIR BELLOWS

BACKGROUND OF THE INVENTION

This invention relates to air bellow devices used with strut members of automobiles to adjust the vehicle height relative to the wheels or axles. The improvement device has end plates with double O-rings and improved fastening locations to strengthen the overall bellows structure.

Current air bellows devices for use with automobiles use only a single O-ring to seal the gap between the strut shaft and the opening in the air bellows end plates. In addition, there are at most three threaded fastening locations to mount the end plates to the bellows element. Both of these features of current art devices present a weak structure relative to the air pressure often created within the air bellows device. This condition causes premature failure of the air bellows system as the constant air pressure changes result in O-ring failure or end plate separation from the bellows device.

As can be seen, there is a need for an end plate structure that resists failure during use under variable air pressure conditions.

SUMMARY OF THE INVENTION

One object of the present invention is improved sealing of the gap between an automobile strut shaft and the opening in the end plates of an air bellows device. Another object is strengthened attachment of the end plates to the air bellows element.

These and other features, aspects and advantages of the present invention will become better understood with reference to the following drawings, description and claims.

DESCRIPTION OF THE PREFERRED EMBODIMENT

Figure 1:
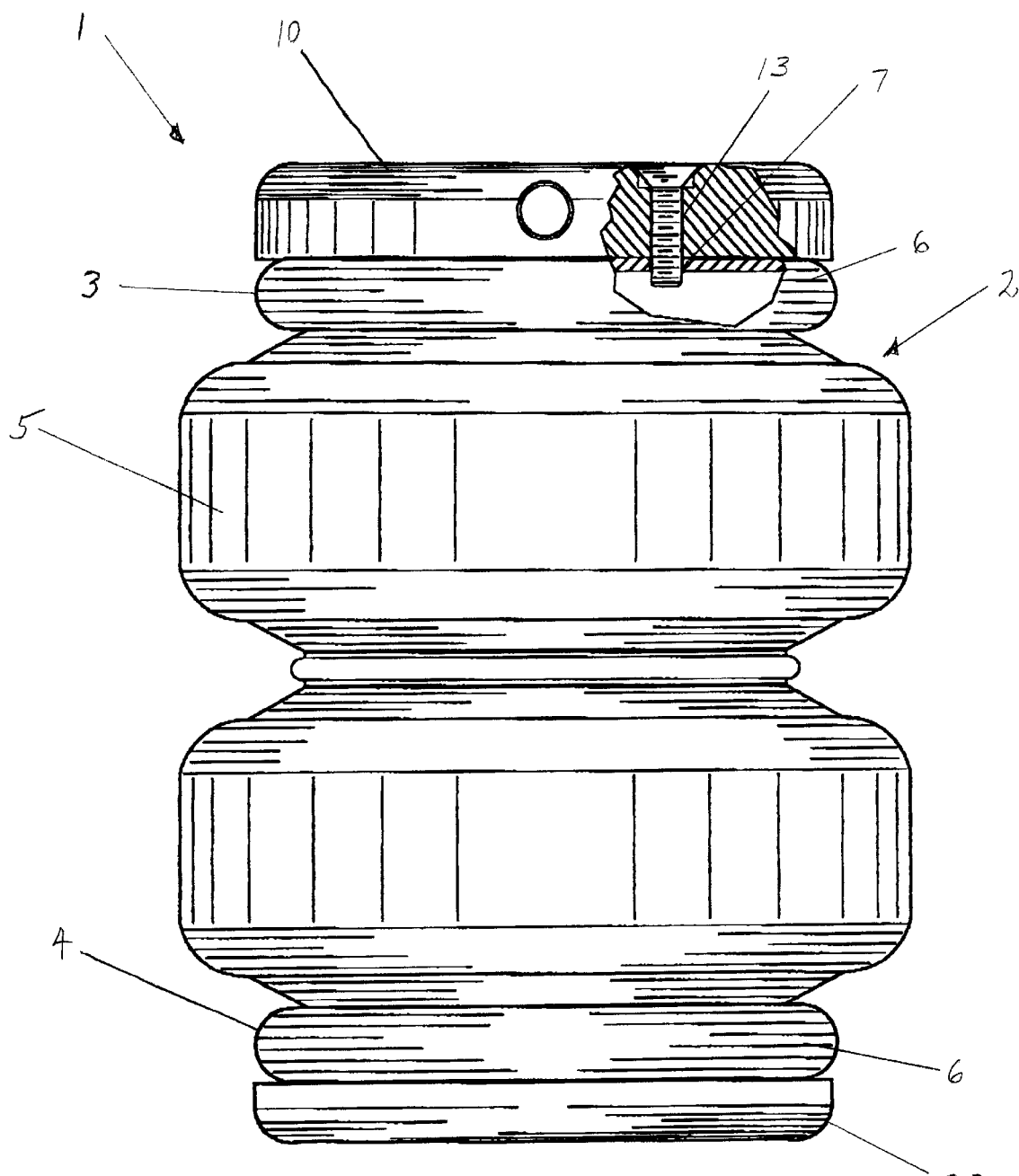
FIG. 1 illustrates a side elevation view of the air bellows device incorporating the present invention.
Figure 2:
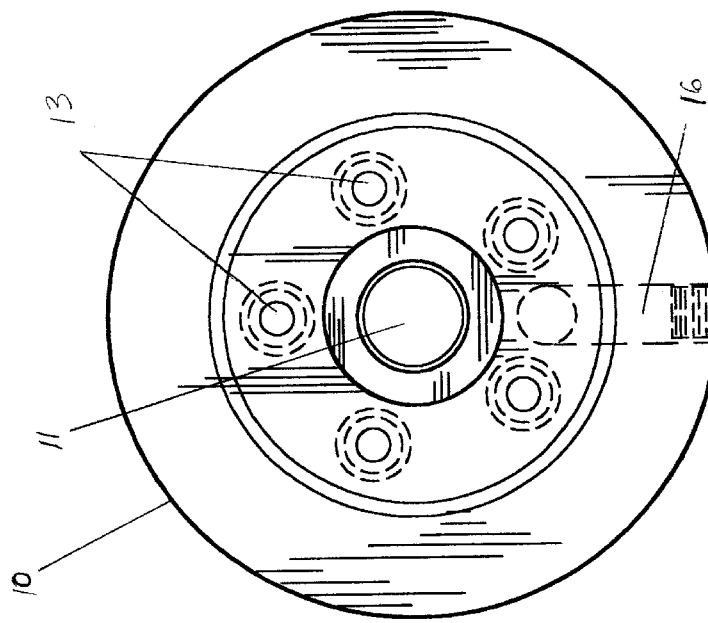
FIG. 2 illustrates a top plan view of the air pressure end plate.
Figure 4:
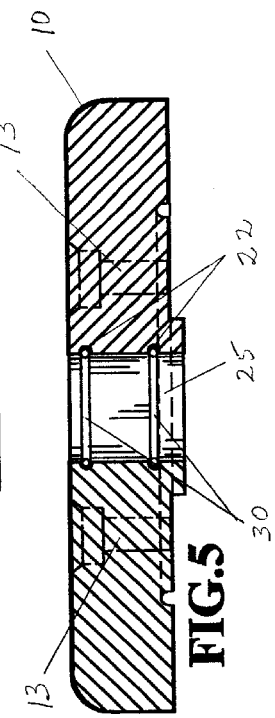
FIG. 4 illustrates a side elevation view of the air pressure end plate.
Figure 3:
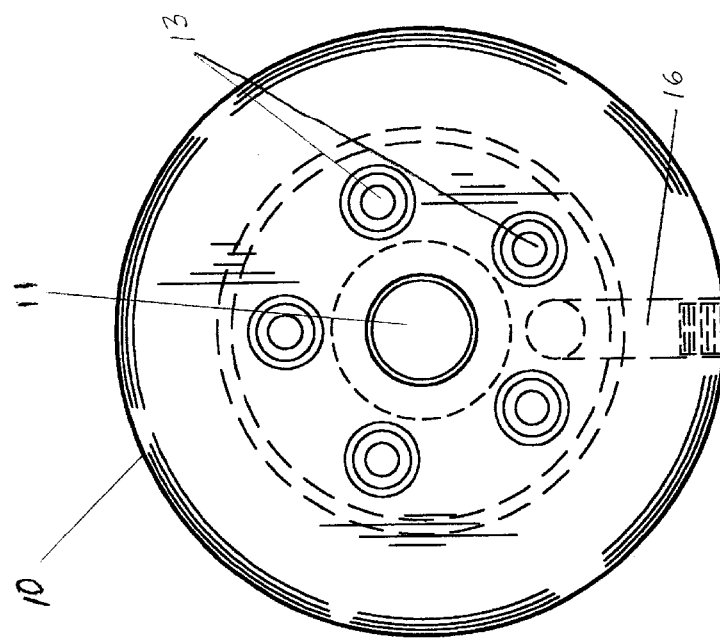
FIG. 3 illustrates a bottom plan view of the air pressure end plate.
Figure 5:
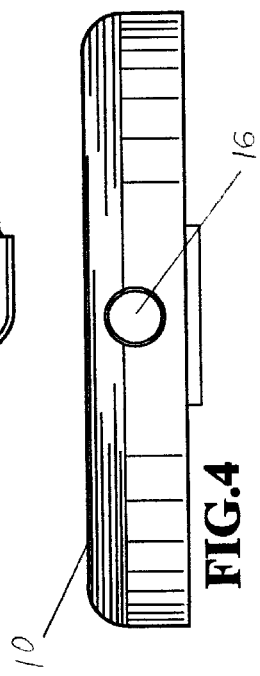
FIG. 5 illustrates a cross-sectional side elevation view of the air pressure end plate.
Figure 7:
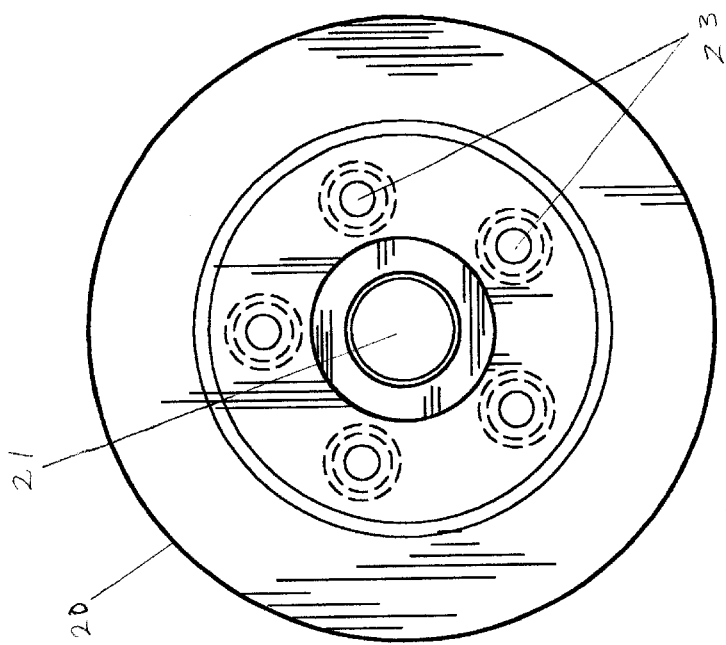
FIG. 7 illustrates a bottom plan view of the pressure end plate.
Figure 9:
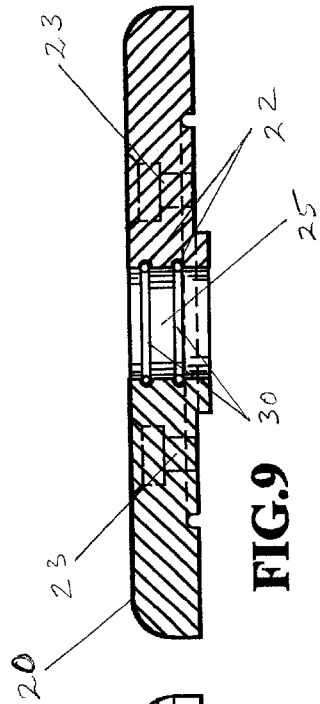
FIG. 9 illustrates a cross-sectional side elevation view of the pressure end plate.
Figure 6:
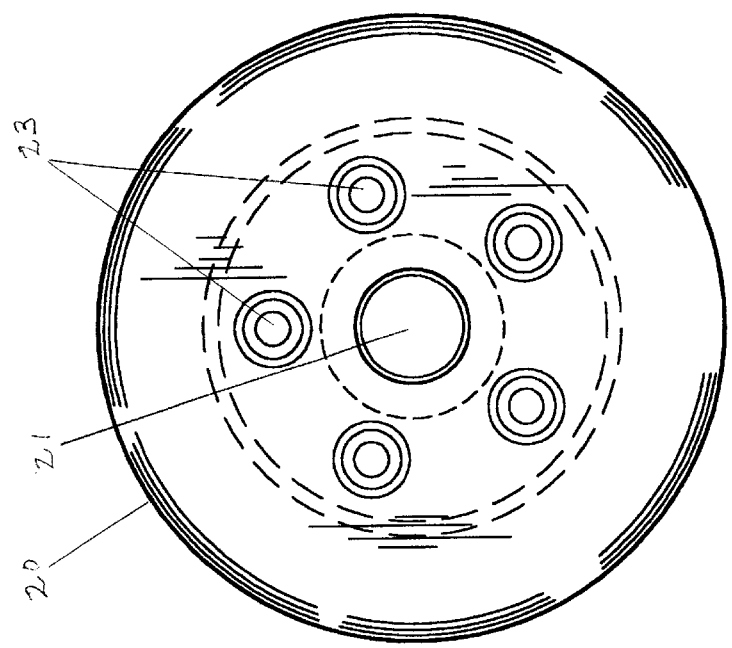
FIG. 6 illustrates a top plan view of the pressure end plate.
Figure 8:
FIG. 8 illustrates a side elevation view of the pressure end plate.

The following detailed description is the best currently contemplated mode for carrying out the invention. The description is not to be taken in a limiting sense, but is made merely for the purpose of illustrating the general principles of the invention.

Referring to FIGS. 1 through 9, an air bellows device 1 for slidably mounting on a strut of an automobile has a bellows element 2 to which an air pressure end plate 10 is attached at one end 3 and a pressure end plate 20 is attached at the opposite end 4. The bellows as is understood in the art is constructed of synthetic rubber in the general shape illustrated in FIG. 1. The rubber body 5 of the bellows element 2 has attached at each end 3, 4 a bellows end cap 6. The bellows end cap 6 provides for attachment of structural plates to accommodate a wide variety of use of the bellows element 2 as for example in adjusting automobile height above the wheels or axles.

In the illustrated embodiment the end plates 10, 20 are designed for use in slidable engagement with a strut shaft of an automobile. The air bellows device 1 is mounted on a strut shaft by sliding the air bellows device onto the strut shaft through openings 11, 21 in the end plates 10, 20. The air bellows device 1 may then be expanded and contracted relative to the rubber body 5 by attaching an air pressure source to pressure fitting 15 to either increase or decrease air pressure inside the device. The use of the air pressure causes the automobile to be raised or lowered relative to the wheels or axles as the pressure change causes the rubber body 5 to expand or contract along the axis of the strut to which it is slidably engaged.

For the improved end plates 10, 20 the openings 11, 21, are structured to accept two O-ring seals 30 in grooves 22. This structure with the two O-rings allows for slidable engagement with a strut shaft, and increases the sealing capacity of the end plates 10, 20 around the strut shaft. This structure with two O-rings 30 in each opening 11, 21 improve performance of the air bellows device 1 under varying pressure conditions created by the pressure source. Existing devices use a simpler plate structure with only one O-ring that thus allows air leakage to occur with a shorter usage time than that of the present invention.

In addition, to accommodating increased usage and air pressure allowed by the double O-ring configuration, the end plates 10, 20 have a five hole 13, 23 radial pattern around the openings 11, 21. This increases the number of attachment locations to fasten the end plates 10, 20 to the bellows end caps 6 thereby increasing the strength of the attachment. A threaded fastener (not shown) is inserted through holes 13, 23 and threadably engaged with threaded holes 7 of bellows end caps 6.

With these improved strengthening features the end plates 10, 20 improve resistances to air leaks as air pressure is varied by a pressure source attached to pressure fitting 15 which causes air to flow through conduit 16 into or out of the air bellows device 1.

Figure 10:
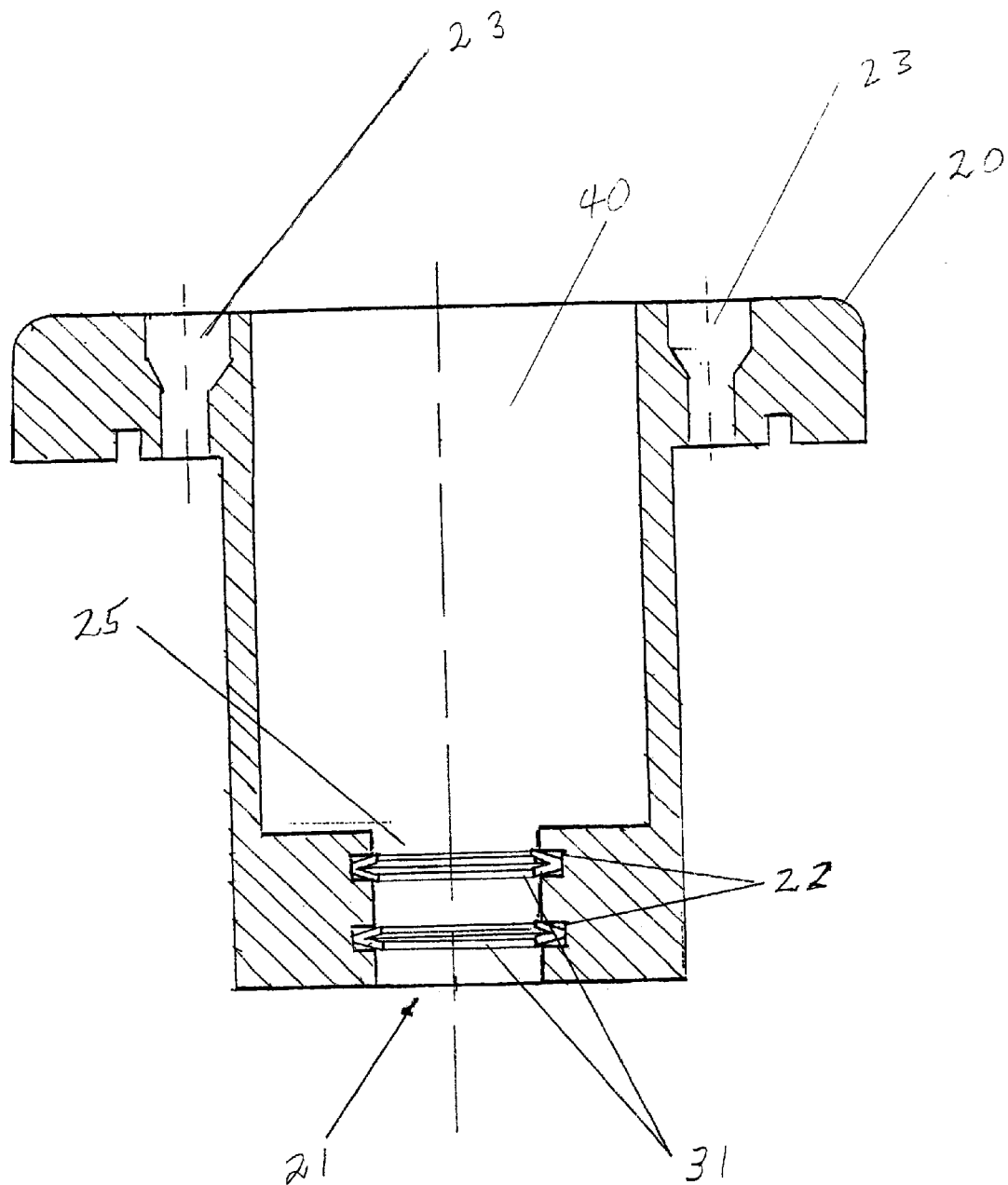
FIG. 10 illustrates a cross-sectional side elevation view of an alternate air pressure end plate.

The preferred embodiment has been described and illustrated using a particular end plate structure. However, as can be appreciated, other end plate structures as for example extended opening lengths or diameters and other shapes may be used with the two O-ring (30) or other appropriate type ring seal combination and five or greater mounting hole configuration. An example of a pressure end plate 20 for use with the front strut of a particular automobile is illustrated in FIG. 10. In this instance an end plate 20 with a deep well 40 therein is illustrated and the use of a lip seal 31 is shown. One of the ring seals may be replaced with a wear ring (not shown).

While the invention has been particularly shown and described with respect to the illustrated and preferred embodiments thereof, it will be understood by those skilled in the art that the foregoing and other changes in form and details may be made therein without departing from the spirit and scope of the invention.

I claim:

1. A device for raising and lowering an automobile frame relative to the vehicle axles having an improved air pressure control system, the improvement comprising:

an air pressure end plate having a pressure fitting and a conduit formed therethrough attachable at one end of a bellows element;

a pressure end plate attachable at an opposite end of the bellows element;

the air pressure end plate and the pressure end plate each having an opening formed therein wherein a pair of grooves are formed in a wall of each opening;

a ring seal is mounted in each groove for slidable engagement with a strut shaft of the automobile;

the air pressure end plate having at least five holes formed therein in a radial pattern about the opening in the air pressure end plate located such that a bolt may pass therethrough for threadable engagement with a corresponding threaded hole formed in an end cap of the bellow element; and the pressure end plate having at least five holes formed therein in a radial pattern about the opening in the pressure end plate located such that a bolt may pass therethrough for threadable engagement with a corresponding threaded hole formed in an opposite end cap of the bellows element.

2. The device as in claim 1 wherein each ring seal is an O-ring.

3. The device as in claim 1 wherein each ring seal is a lip seal.

4. The device as in claim 1 wherein one of the ring seals is a wear seal.

* * * * *